(12) United States Patent
Luepke et al.

(10) Patent No.: US 8,439,663 B2
(45) Date of Patent: May 14, 2013

(54) DE-MOLD LINER BASED INJECTION TOOL

(75) Inventors: Rick A. Luepke, Fort Worth, TX (US); Matthew A. Sodergren, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 68 days.

(21) Appl. No.: 13/096,370

(22) Filed: Apr. 28, 2011

(65) Prior Publication Data

US 2012/0273985 A1 Nov. 1, 2012

(51) Int. Cl.
*B29C 45/40* (2006.01)

(52) U.S. Cl.
USPC ............. 425/4 R; 425/394; 425/437; 425/556

(58) Field of Classification Search .................. 425/394, 425/4 R, 437
See application file for complete search history.

(56) References Cited

U.S. PATENT DOCUMENTS

| | | | |
|---|---|---|---|
| 3,719,441 A * | 3/1973 | Spaak et al. ................. | 425/4 R |
| 4,753,847 A | 6/1988 | Wilheim et al. | |
| 5,074,770 A * | 12/1991 | Graefe ........................... | 425/546 |
| 5,415,536 A * | 5/1995 | Ohno ............................ | 425/547 |
| 5,728,333 A * | 3/1998 | Tabata et al. ................. | 264/46.4 |
| 5,846,662 A | 12/1998 | Baumgardner et al. | |
| 6,296,949 B1 | 10/2001 | Bergstresser et al. | |
| 2004/0075184 A1 | 4/2004 | Brown et al. | |
| 2006/0027314 A1 | 2/2006 | Jones et al. | |
| 2010/0009109 A1 | 1/2010 | Ozawa | |
| 2010/0244332 A1 | 9/2010 | Soong | |
| 2011/0024032 A1* | 2/2011 | Barber et al. ................. | 156/245 |

FOREIGN PATENT DOCUMENTS

| | | |
|---|---|---|
| EP | 0673742 | 9/1995 |
| EP | 0719624 | 7/1996 |

* cited by examiner

*Primary Examiner* — Tim Heitbrink
(74) *Attorney, Agent, or Firm* — Reising Ethington P.C.; John J. Snyder

(57) ABSTRACT

A mold apparatus comprising a release liner removably securable to a mold tool face by a liner vacuum system configured to hold the release liner in place against the tool face, the liner vacuum system comprising at least one liner vacuum port extending and providing fluid communication between the mold face and a vacuum source. The liner vacuum system is actuable to hold the release liner in place against the tool face in advance of and during material injection and during curing and may be further actuable to subsequently release the tool from the liner, leaving the release liner to be peeled from the cured material.

15 Claims, 4 Drawing Sheets

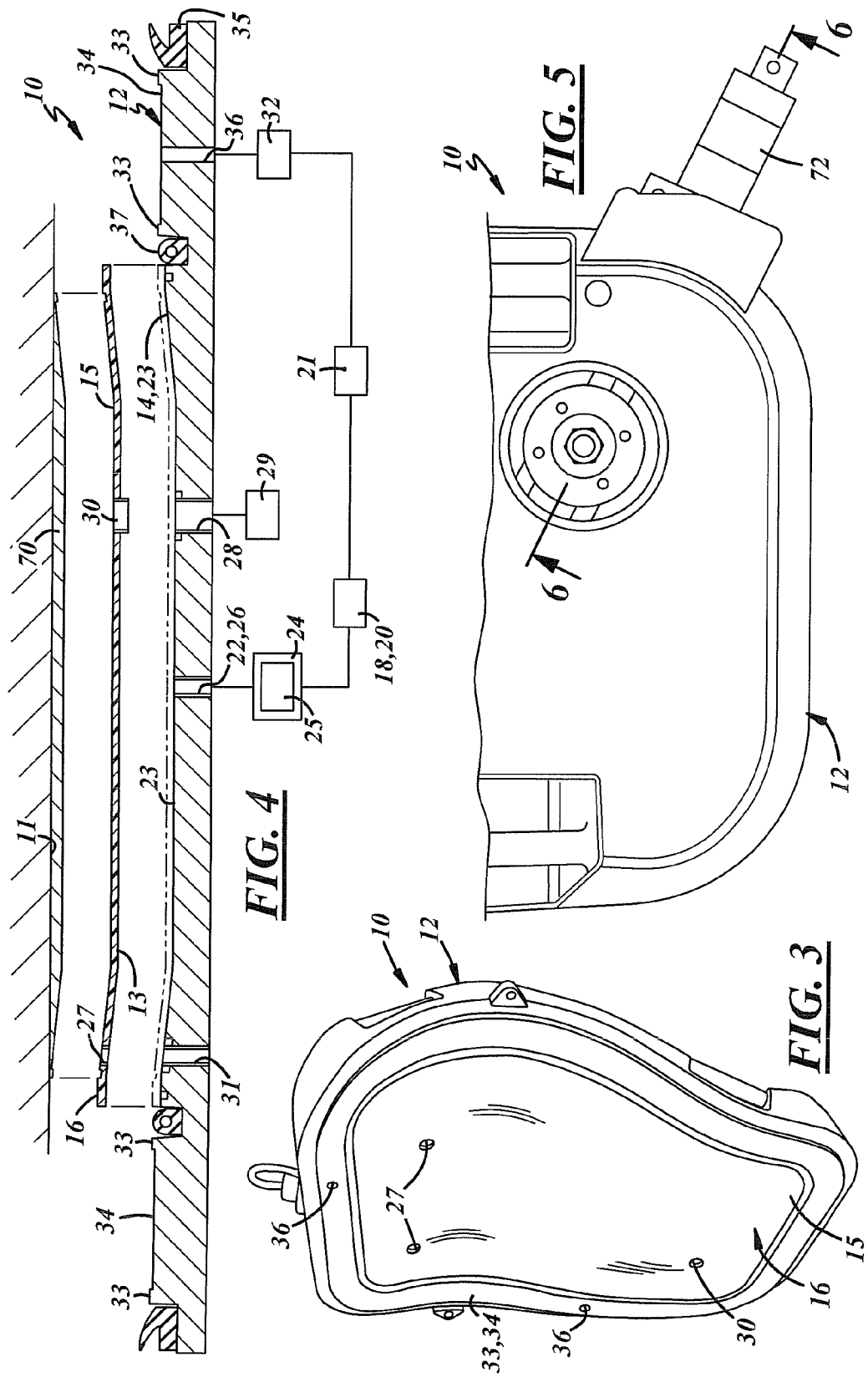

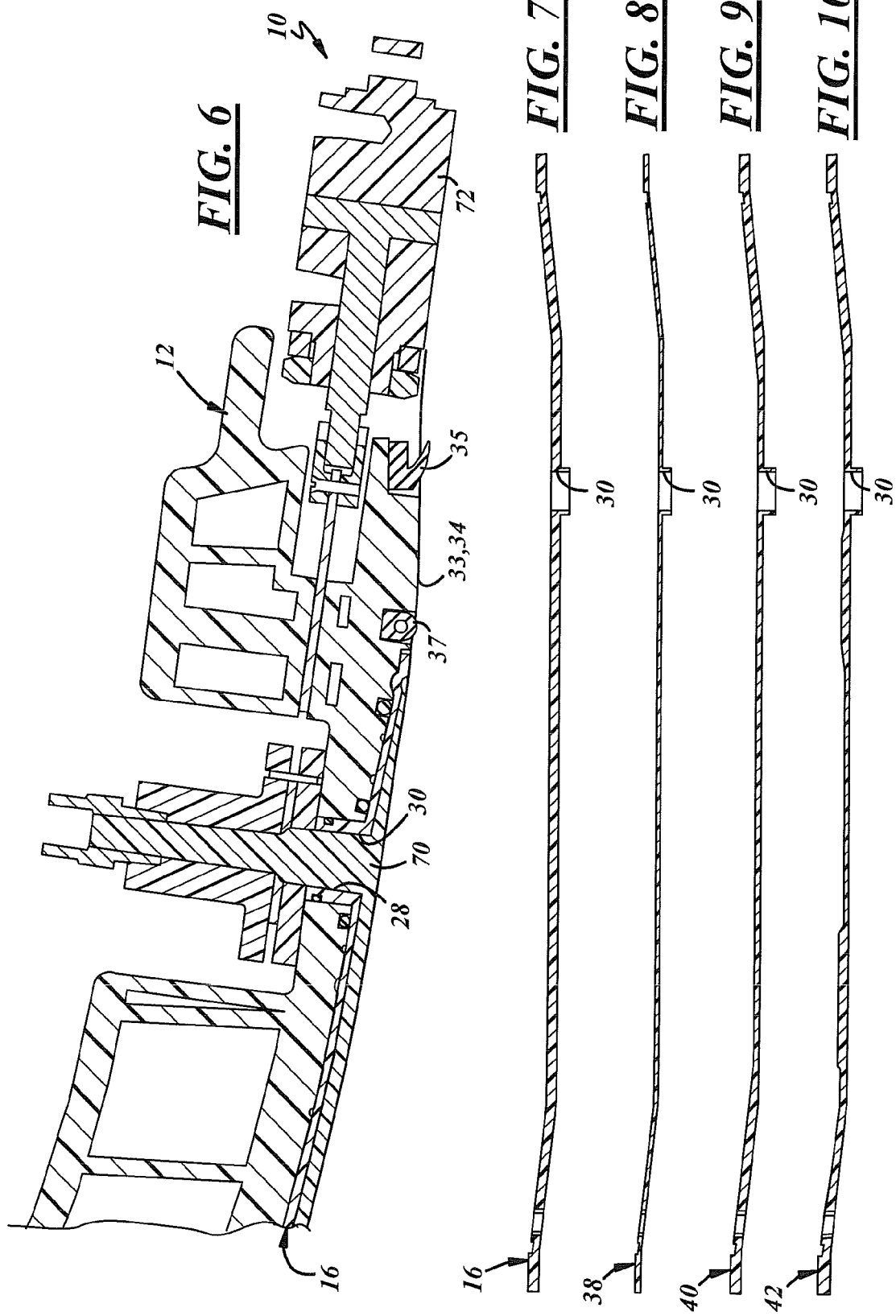

DE-MOLD LINER BASED INJECTION TOOL

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a method and apparatus for injection molding and for release of a mold tool from injection molded material.

2. Description of the Related Art Including Information Disclosed Under 37 CFR 1.97 and 1.98

In molding operations such as mold-in-place injection molding it can be difficult to de-mold an open-face rigid injection tool from cured materials such as low observable (LO) performance coatings that have been molded onto an outer surface of an aircraft. When injected materials cure they typically develop a high surface friction contact interface not only with the work surface onto which they have been deposited in the molding process, but also with the cavity or face of an injection mold tool used in that process. This makes it difficult to readily remove such a mold tool from cured material without using wedges or pry methods to break the contact between the tool face and the injected material. To facilitate the use of an automated process to place and remove an open-face injection mold tool it would be advantageous if such a mold tool were configured to be readily demoldable from injected material. If, in an automated process, an injection tool is not readily demoldable from injected material deposited on a work surface, significant damage could occur to the work surface and/or to automation equipment. Automation equipment may be damaged by the application of the amount of pressure, i.e., pull force that would likely be necessary to break surface friction amount of pressure, i.e., pull force that would likely be necessary to break surface friction between tool face and cured material. The sticking of a tool face to cured material formed on a work surface would probably also require personnel intervention, exposing personnel to unnecessary danger.

In vacuum-molding operations one approach to insuring the release of cured molded material from a mold tool face is to affix a stiff pre-formed air-permeable liner to the mold face and connect the liner to a vacuum source. Sheet material to be molded is then placed on the liner and the vacuum source is actuated to draw air from the liner and create suction between the sheet material and the tool face, drawing the sheet material against the tool face. The liner thus functions as a suction conductor between the tool face and sheet material and effectively vacuum forms the sheet material against the tool face. After the sheet material has cured, the liner is separated from the cured material and remains affixed to the tool. To aid in separating the cured sheet material from the liner air may be blown into and through the liner.

BRIEF SUMMARY OF THE DISCLOSURE

A mold apparatus is provided comprising a mold tool having a tool face shaped to impart a desired shape to molded material, and further comprising a first release liner carried by the mold tool on the tool face. A liner vacuum system holds the release liner in place against the tool face and includes at least one liner vacuum port that extends and provides fluid communication between the tool face and a vacuum source. The liner vacuum system is actuable to hold the release liner in place against the tool face.

The apparatus may include a gas injector system configured to blow air between the tool face and the first release liner to help release the liner from the tool following injection and curing of molded material. The gas injector system may include an injection port that extends and provides fluid communication between a pressurized gas source and the tool face.

The first release liner may be peelable from the cured molded material to expose the molded material and to allow the liner to be returned to the mold and reused. An outer surface of the first release liner may be shaped to match the surface contours of the tool face to insure that tool face contours are accurately transferred to molded material.

The apparatus may include a second release liner interchangeable with the first release liner and having a generally constant thickness less than that of the first release liner so that a second layer of the same or a different material can be molded over a first layer of molded material using the same mold tool. Alternatively, the second release liner may have a variable thickness less than or equal to that of the first release liner so that a second layer of the same or a different material can be molded over a first layer of molded material into a different shape than the first layer of molded material while using the same mold tool used to shape the first layer of molded material. As a further alternative the second release liner may have a thickness less than that of the first release liner and a shape that is laterally non-coextensive with that of the first release liner so that a second layer of the same or a different material can be molded over a portion or portions of a first layer of molded material using the same mold tool used to shape the first layer of molded material. The release liner may be generally coextensive with the mold face to prevent contact and any consequent adhesion between molded material and any portion of the mold face.

The mold tool may include a liner vacuum bay formed into the tool face. At least one liner vacuum port may extend and provide fluid communication between the liner vacuum bay and the vacuum source and may thus be configured to hold the release liner to the tool face to insure that the contours of the mold tool face are imparted to the release liner.

The mold tool may include a material injection port that extends and provides fluid communication between the tool face and a source of injection material. The release liner may include a material injection opening alignable with the material injection port to provide a path for injection material to be injected into the mold and to help locate the release liner on the tool face.

The mold may be an open-face injection mold configured for mold-in-place operations that deposit molded material on a working surface. The mold tool of such a mold may have a tool perimeter surface configured to be sealed against the working surface.

The apparatus may include a perimeter vacuum system configured to seal a perimeter surface of the mold tool to a working surface. The perimeter vacuum system may include a perimeter vacuum bay formed into the perimeter surface of the mold tool, and may also include at least one perimeter vacuum port extending from the perimeter vacuum bay to the vacuum source. The perimeter vacuum system is act cable to releasably draw and hold the working surface against the tool perimeter surface of the mold tool to support the tool on and seal the perimeter of the tool against the working surface in advance of and during material injection and during curing.

In addition, a molding method is provided, which may include the steps of locating a release liner on a tool face of a mold tool of a mold apparatus, holding the release liner in place against the tool face by actuating a liner vacuum system to draw a vacuum between the release liner and the tool face, closing the mold apparatus, providing a curable flowable material in a mold cavity of the mold apparatus, allowing the material to cure, actuating the liner vacuum system to release the vacuum between the release liner and the tool face, opening the mold apparatus, and peeling the release liner from the cured material.

Where the mold apparatus is an open-face mold-in-place injection mold apparatus, the mold closing step may include sealing an open-face mold tool perimeter surface against a working surface such that the mold tool face and working surface cooperate to form a mold cavity, and the step of providing material may include injecting the material into the mold cavity.

Where the mold apparatus includes a perimeter vacuum system the step of sealing the tool perimeter surface against the working surface may include actuating the perimeter vacuum system to draw a vacuum between the tool perimeter surface and the working surface. Air may be injected between the release liner and the tool face to aid in separating the release liner from the tool face.

Another layer of the same or different material may be added over the first layer of molded material by repeating the drawing step using a second release liner having a generally constant thickness less than that of the first release liner, then repeating the release liner drawing and holding, mold closing, material providing, material curing, tool releasing, mold opening, and peeling steps.

Another layer of the same or different material may be added over the first layer of molded material by repeating the release liner locating step using a second release liner of varying thickness less than or equal to that of the first release liner, then repeating the release liner drawing and holding, mold closing, material providing, material curing, tool releasing, mold opening, and peeling steps.

Another layer of the same or different material may be added over a portion or portions of the first layer of molded material by repeating the release liner locating step using a second release liner having a thickness less than that of the first release liner and a shape that may be laterally non-coextensive with that of the first release liner, then repeating the release liner drawing and holding, mold closing, material providing, material curing, tool releasing, mold opening, and peeling steps.

The mold apparatus may include two or more interchangeable release liners that the mold tool liner vacuum system is configured to releasably hold against the mold tool face. The two or more interchangeable release liners may be shaped to compensate for profile variations between working surfaces. Where a mold apparatus include two or more such release liners, it may be determined in advance of molding which of two or more profile variants that a target working surface has, and then the step of locating the release liner may include selecting whichever of the two or more interchangeable release liners best compensates for the profile variant of the target working surface. The two or more interchangeable release liners may be shaped to each include an outer surface profile that complements that of the mold tool face. An inner surface profile of each of the release liners may be shaped to complement one of the two or more working surface profile variants.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 3 is a perspective view of the mold apparatus of FIG. 1 with the release liner shown retained in position against the mold face of the mold tool.

FIG. 4 is a cross-sectional view of the mold apparatus of FIG. 1 taken along line 4-4 of FIG. 1 and showing the release liner and molded-on material exploded away from the mold face;

FIG. 5 is a fragmentary lower back view of the mold apparatus of FIG. 1;

FIG. 6 is a fragmentary cross-sectional view of the mold apparatus taken along line 6-6 of FIG. 5;

FIG. 7 is a cross-sectional view of a release liner of the apparatus of FIG. 1;

FIG. 8 is a cross-sectional view of an alternative release liner configuration;

FIG. 9 is a cross-sectional view of another alternative release liner configuration;

FIG. 10 is a cross-sectional view of yet another alternative release liner configuration.

DETAILED DESCRIPTION OF INVENTION EMBODIMENT

Figure 1:
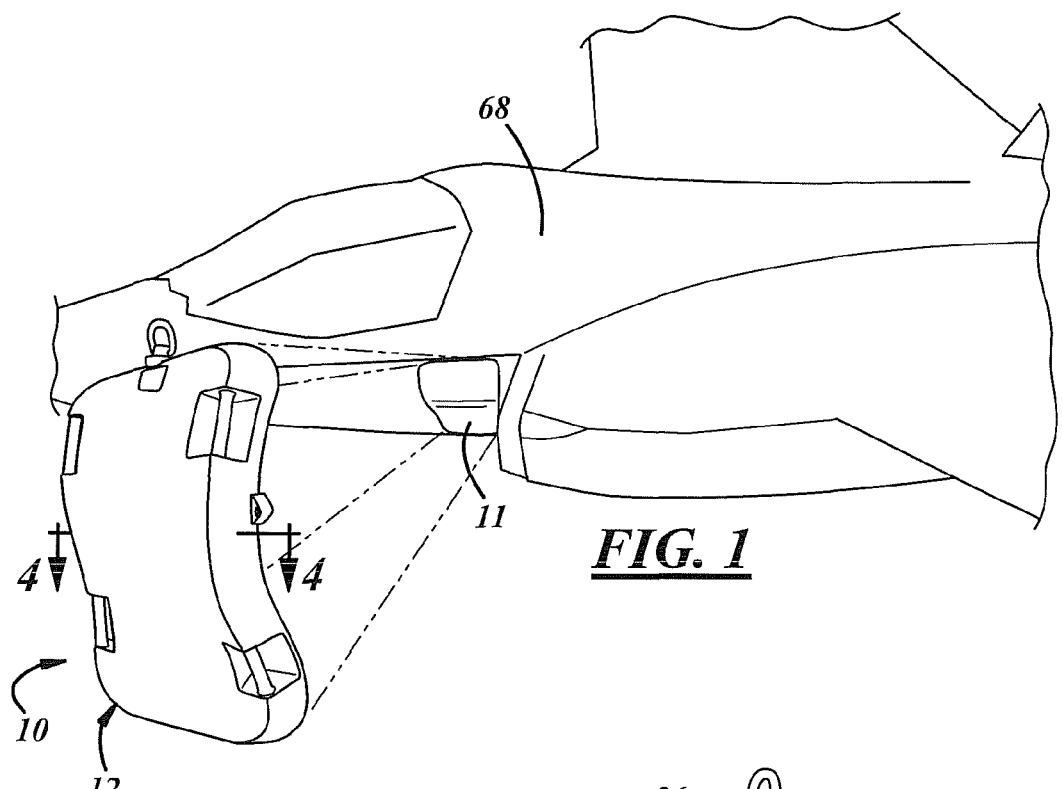
FIG. 1 is a perspective view of a mold apparatus constructed according to an embodiment of the invention and shown removed from an F-35 aircraft fuselage working surface where a forward fuselage compression bump has been molded in-place, leaving a release liner of the apparatus adhered to the molded-on material.

A mold release apparatus for molding material and then releasing a mold tool from the molded material is generally shown at 10 in FIGS. 1-6. The apparatus 10 may include a rigid injection mold tool, generally indicated at 12, having a tool face 14 configured to impart a desired shape to molded material 70. A primary release liner 16, which may be An approximately 0.125" thick and air-impervious, is carried by the mold tool on the tool face. The apparatus 10 may also include a liner retainer 18 which may comprise a liner vacuum system 20 configured to hold the release liner 16 in place against the tool face 14. The apparatus 10 may also include secondary liners 38, 40, 42, which will be described in detail below. As best shown in FIG. 4, the liner vacuum system 20 may comprise a vacuum source 21 and two liner vacuum ports 22 extending and providing fluid communication between the mold face 14 and the vacuum source 21. The liner vacuum system 20 may be actuable to draw and hold the release liner 16 into place against the tool face 14 in advance of, and during material injection, and during curing, to subsequently release the tool 12 from the liner 16, leaving the release liner 16 to be peeled from the cured material 70.

The mold apparatus 10 may include two or more interchangeable primary release liners 16 that the mold tool liner vacuum system 20 is configured to releasably hold against the mold tool face 14. The two or more interchangeable primary release liners 16 may be shaped slightly differently from one another to compensate for two or more respective known profile variations in working surfaces. Where a mold apparatus 10 includes two or more such primary liners 16, it may be determined in advance of molding which of two or more profile variants a target working surface 11 has, and then a primary release liner 16 may be selected from the two or more interchangeable release liners, which best compensates for the profile variant discovered on the target working surface 11. The two or more interchangeable primary liners 16 may be shaped to each include an outer surface 13 that complements that of the mold tool face 14. Inner surfaces 15 of the primary liners 16 may be shaped slightly differently from one another to complement one of the two or more working surface profile variants.

As best shown in FIG. 4, the apparatus 10 may include a gas injector system 24 configured to blow air between the tool face 14 and a liner 16 to aid in releasing the liner 16 from the mold tool face 14 following curing. The gas injector system 24 may include a pressurized gas source 25 and an injection port 26 extending and providing fluid communication between the gas source 25 and the tool face 14. The liner vacuum system 20 may alternatively be configured to be actuable to reverse flow and blow air through the liner vacuum ports 22.

Figure 2:
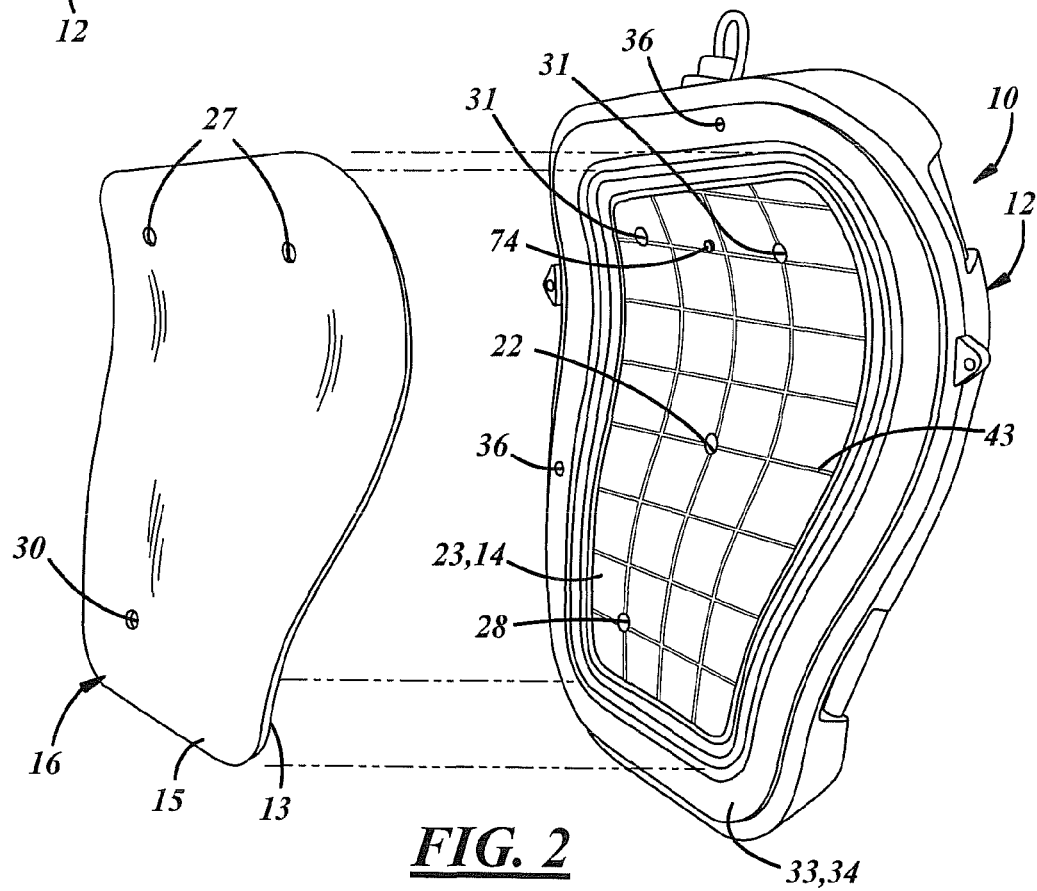
FIG. 2 is a perspective view of the mold apparatus of FIG. 1 with the release liner shown removed from a mold face of a mold tool of the apparatus.

As shown in FIGS. 2-4, the apparatus 10 may also include one or more vent ports 31 that may be alignable with respective openings 27 in the liner 16 to vent air from the mold tool 12 as material 70 is being injected through a material injection port 28. The vent ports 31 may further be configured for use in positively locating the liner 16 on the tool face 14.

The primary liner 16 may be sufficiently flexible to be peeled from the cured molded material 70 to expose the molded material 70 and to allow the liner 16 to be returned to the mold tool 12 and reused. The primary liner 16 may be preformed to have its outer surface 13 shaped to match or complement the profile or surface contours of the mold face 14 to ensure that mold tool face contours are accurately transferred to the molded material 70. The inner surface 13 of the primary liner 16 may be shaped to complement the profile of the working surface 11 onto which the material 70 is to be molded. In the present embodiment of the mold face 14, both the inner 15 and outer 13 surfaces of the primary liner 16 are shaped to match the contours of the working surface 11 so that a layer of material 70 of generally constant thickness may be applied and molded onto the working surface 11. The primary release liner 16 may be generally coextensive with the mold face 14 to prevent contact and any consequent adhesion between molded material 70 and any portion of the mold face 14.

As shown in FIG. 8, the apparatus 10 may include a secondary liner 38 that may be thinner than the primary liner 16, air impervious, and/or interchangeable with the primary liner 16. The secondary liner 38 may be preformed to have a generally constant thickness less than that of the primary liner 16. This allows a second layer of the same or a different material 70 to be molded over a first layer of molded material 70 using the same mold tool 12.

As shown in FIG. 9, the apparatus 10 may alternatively or further include a variable thickness secondary air-impervious liner 40 that may be interchangeable with the primary liner 16 and that may be preformed to have a variable thickness less than or equal to that of the primary liner 16. This is so that a second layer of the same or a different material 70 can be molded over a first layer of molded material 70 into a different shape than the first layer of molded material 70 while using the same mold tool 12 used to shape the first layer of molded material 70.

As shown in FIG. 10, the apparatus 10 may alternatively include a partial variable thickness secondary air-impervious liner 42 that may be interchangeable with the primary liner 16 and that may be preformed so that one or more portions of the liner has a thickness less than that of the primary liner 16. This is so that a second layer of the same or a different material 70 can be molded in variable thickness over a portion or portions of a first layer of molded material 70 using the same mold tool 12 used to shape the first layer of molded material 70.

As best shown in FIGS. 2 and 4, the mold tool 12 may include a liner vacuum bay 23 formed into the tool face 14. The liner vacuum ports 22 may extend and provide fluid communication between the vacuum bay 23 and the vacuum source 21. The liner vacuum bay 23 may be configured to hold a liner 16, 38, 40, 42 tightly to the tool face 14 to ensure that the contours of the mold tool face 14 are imparted to on or more of the liners 16, 38, 40, 42. As best shown in FIG. 2, the liner vacuum bay may comprise a grid of grooves 43 formed into the tool face 14.

As shown in FIGS. 4 and 6, the mold tool 12 may include a material injection port 28 that extends and provides fluid communication between the tool face 14 and a source of injection material 29. As is also shown in FIGS. 4 and 6, the liners 16, 38, 40, 42 may each include a material injection opening 30 alignable with the material injection port 28 to provide a path for injection material 70 to be injected into the mold 12. The material injection port 28 may also serve to help positively locate liners 16, 38, 40, 42 on the tool face 14.

The mold 12 may be an open-face injection mold configured for mold-in-place operations that deposit molded material 70 on a working surface such as, as shown in FIG. 1, a forward fuselage compression bump on an F-35 aircraft. The mold tool 12 may be an open-face rigid mold tool including the tool face 14 shaped to cooperate with the working surface to impart a desired shape to molded material 70 injected there between. The mold tool 12 may have a tool perimeter surface 33 surrounding the tool face 14, which may be configured to be sealed against a working surface such as the outer surface of an aircraft fuselage 68.

As best shown in FIGS. 2, 3 and 4, the apparatus 10 may include a perimeter vacuum system 32 configured to seal the perimeter surface 33 of the mold tool 12 to the working surface 11. The perimeter vacuum system 32 may include the vacuum source 21, a marginal or perimeter vacuum bay 34 formed into the perimeter surface 33, an outer seal 35 lining the tool 12 outboard of the perimeter vacuum bay 34, an inner seal 37 lining the inside of the perimeter vacuum bay 34, and one or more perimeter vacuum ports 36 that each extend from the perimeter vacuum bay 34 to the vacuum source 21. The outer seal 35 may be a "J" profile seal and the inner seal 37 may be a "D" profile seal. The perimeter vacuum system 32 may be actuable to releasably draw and hold the working surface 11 against the tool perimeter surface 33 of the mold tool 12 to support the tool 12 on and seal the perimeter surface 33 of the tool 12 against the working surface 11 in advance of, and during material 70 injection, and during curing. In other words, the perimeter vacuum system 32 may seal the tool perimeter 33 against the working surface 11 so that the working surface 11 and the mold tool face 14 may together define a mold cavity. The perimeter vacuum system 32 may be actuable to open the mold cavity by subsequently releasing the tool 12 from the working surface 11, leaving the cured molded material 70 and a release liner 16, 38, 40, 42 behind on the working surface 11.

As shown in FIGS. 5 and 6, the mold tool 12 may include a sprue cutter 72. Once the injected material 70 has cured, and the mold tool 12 is ready to be removed, the sprue cutter 72 may be activated to separate the cured molded material 70 that has been applied against the work surface 11 from cured material occupying the injection port 28.

Figure 11:
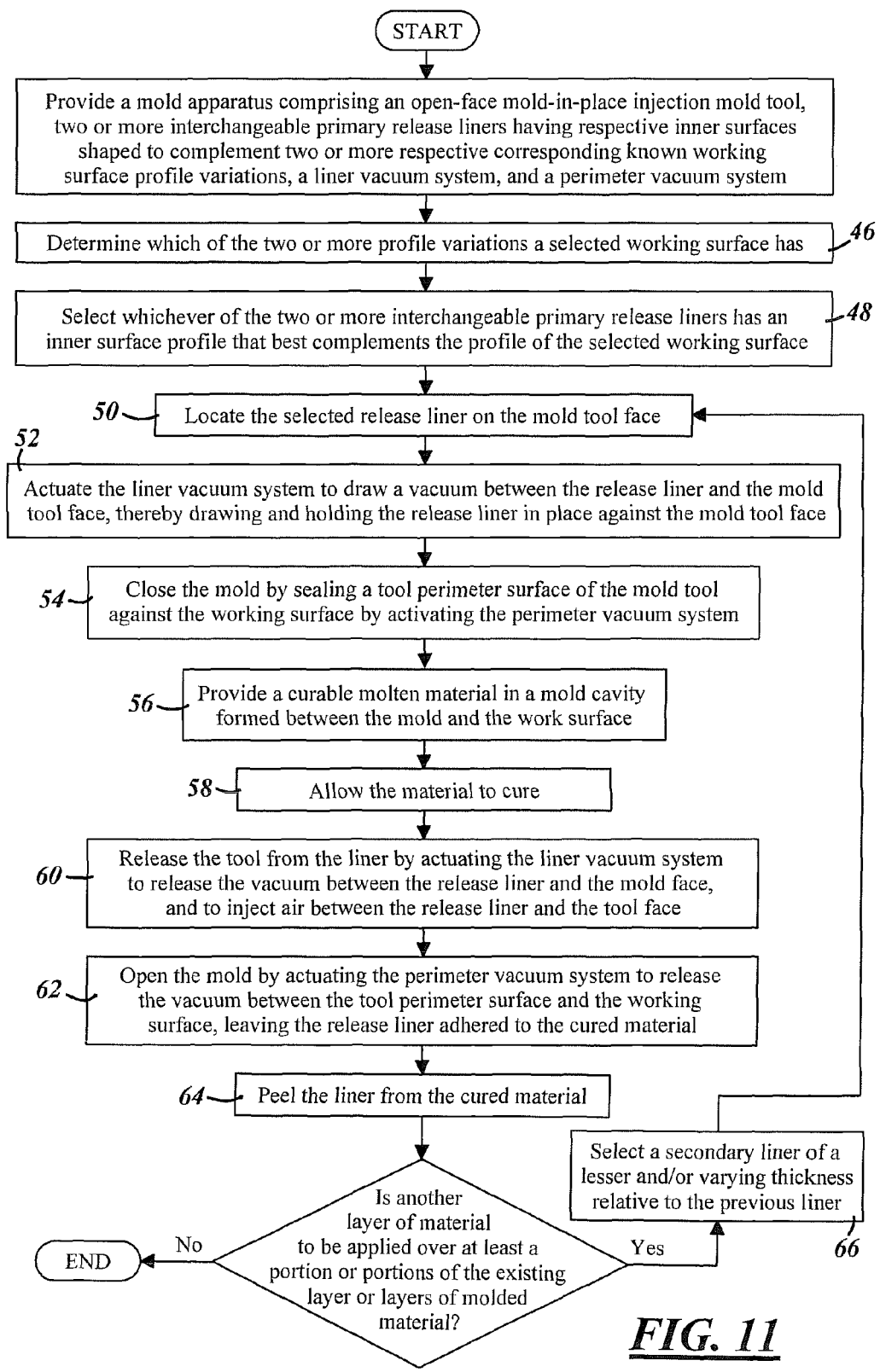
FIG. 11 is a flow chart showing a method of using an open-face mold tool to apply mold material to a working surface in a mold-in-place injection molding operation.

In practice, and as shown in the flow chart of FIG. 11, an open-face mold tool can be removably used to apply mold material 70 to a working surface in a mold-in-place injection molding operation by first scanning the profile of a selected working surface 11 to determine, as shown in action step 46, which of the two or more known working surface profile variants the working surface 11 comprises, and then selecting whichever of the two or more interchangeable primary release liners 16 best compensates for the working surface profile variant as shown in action step 48.

As shown in action step 50, the selected primary release liner 16 may then be located on the tool face 14. The selected primary release liner 16 may then be retained in position against the tool face 14 by actuating the liner vacuum system 20 to draw a vacuum between the selected primary release liner 16 and the tool face 14 as shown in action step 52.

As shown in action step 54, the tool perimeter surface 33 may be sealed against the working surface 11 by actuating the perimeter vacuum system 32 to draw a vacuum between the perimeter vacuum bay 34 formed in the tool perimeter surface, and the working surface 11. This may result in the perimeter vacuum bay of the mold tool 12 being held against the working surface with a force of approximately 14 psi.

Mold sealing may include sealing the tool perimeter surface 33 of the open-face mold tool 12 against the working surface 11 such that the mold face 14 and working surface 11 may cooperate to form a mold cavity. The provision of material 70 may include injecting the material 70 into the mold cavity between the tool face-mounted liner 16 and the working surface 11, preferably at less than or equal to approximately ⅙ the force with which the perimeter surface 33 of the mold tool 12 is held against the working surface 11 by the perimeter vacuum system 32. This provides a safety margin should the liner vacuum pressure diminish or be lost. In other words, the force exerted against the mold tool 12 by material injection may be held to ⅙ the force exerted by atmosphere on the mold tool 12 to preclude the injection step from separating the mold tool 12 from the working surface 11.

A curable flowable material 70 may then be provided in the mold cavity of the mold tool 12 as shown in action step 56, and the material 70 allowed to cure according to action step 58.

As shown in action step 60, the mold tool 12 may be released from the primary liner 16 by actuating the liner vacuum system 20 to release the vacuum between the primary release liner 16 and the tool face 14. If necessary, the tool 12 may also be released by injecting air between the primary release liner 16 and the tool face 14.

The mold 12 may then be removed from the work surface 11 as shown in action step 62, and the liner 16 peeled from the cured material 70 according to action step 64

As shown in action step 66, another layer of the same or different material 70 may be added over a portion, portions, or the entire first layer of molded material 70 by repeating the liner locating step using a secondary liner of a generally constant thickness less than that of the primary liner 16 as shown at 38 in FIG. 8, of varying thickness less than or equal to that of the primary liner 16 as shown at 40 in FIG. 9, and/or having one or more regions of lesser and/or varying thickness that are non-coextensive with the primary liner 16 as shown at 42 in FIG. 10. The liner drawing and holding, mold closing, material 70 providing, material curing, tool releasing, mold opening, and peeling steps may then be repeated.

An apparatus constructed as described above may allow an open-faced injection mold apparatus to be quickly attached and detached from a working surface. It also may allow for the molding of material into different configurations on a working surface using a single open-face mold tool, prevent sticking of the mold tool to a working surface, allow the mold tool to be efficiently removed without the use of extra tools or methods that might damage the working surface or the molded material, and/or allow for quick reconfiguration of a mold to produce differently shaped and sized layers of molded material to complement a range of different working surfaces.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An open-face injection mold apparatus for mold-in-place operations that deposit material on a working surface, the apparatus comprising:
   an open-face mold tool having a tool face configured to cooperate with a working surface to impart a desired shape to molded material injected between the tool face and working surface;
   a first release liner carried by the mold tool on the tool face; and
   a liner vacuum system configured to hold the release liner in place against the tool face and comprising at least one liner vacuum port extending and providing fluid communication between the mold face and a vacuum source, the liner vacuum system being actuable to draw and hold the release liner in place against the tool face and to subsequently release the tool from the liner.

2. A mold apparatus as defined in claim 1 in which the apparatus includes a gas injector system configured to blow air between the tool face and the first release liner.

3. A mold apparatus as defined in claim 2 in which the gas injector system includes an injection port extending and providing fluid communication between a pressurized gas source and the tool face.

4. A mold apparatus as defined in claim 1 in which the first liner is sufficiently flexible to be peeled from the cured molded material.

5. A mold apparatus as defined in claim 1 in which the first liner has an outer surface-shaped to match the surface contours of the mold face.

6. A mold apparatus as defined in claim 5 in which the apparatus includes a second liner interchangeable with the first liner and having a generally constant thickness less than that of the first liner.

7. A mold apparatus as defined in claim 5 in which the apparatus includes a second liner interchangeable with the first liner and having a variable thickness less than or equal to that of the first liner.

8. A mold apparatus as defined in claim 5 in which the apparatus includes a second liner interchangeable with the first liner and having a thickness less than that of the first liner and a shape that is laterally non-coextensive with that of the first liner.

9. A mold apparatus as defined in claim 1 in which the liner is generally coextensive with the mold face.

10. A mold apparatus as defined in claim 1 in which the mold tool includes a liner vacuum bay formed into the tool face, the at least one liner vacuum port extending and providing fluid communication between the mold bay and the vacuum source and the liner vacuum bay being configured to hold the liner tightly to the tool face.

11. A mold apparatus as defined in claim 1 in which the mold tool includes a material injection port that extends and provides fluid communication between the tool face and a source of injection material, the liner including a material injection opening alignable with the material injection port.

12. A mold apparatus as defined in claim 1 in which the mold tool has a tool perimeter surface configured to be sealed against a working surface.

13. A mold apparatus as defined in claim 1 in which the apparatus includes a perimeter vacuum system configured to seal a perimeter surface of the mold tool to a working surface.

14. An open-face injection mold apparatus for mold-in-place operations that deposit material on a working surface, the apparatus comprising:

an open-face mold tool including:

a tool face configured to cooperate with a working surface to impart a desired shape to molded material injected therebetween; and a tool perimeter surface configured to be sealed against a working surface; and a perimeter vacuum system configured to seal the perimeter surface of the mold tool to a working surface.

15. A mold apparatus as defined in claim 14 in which:

the perimeter vacuum system includes:

a perimeter vacuum bay formed into the perimeter surface; and at least one perimeter vacuum port extending from the perimeter vacuum bay to the vacuum source; and the perimeter vacuum system is actuable to releasably draw and hold the working surface against the tool perimeter surface of the mold tool.

\* \* \* \* \*